No. 777,733. PATENTED DEC. 20, 1904.
M. KANE & F. P. BURKHARDT.
GRAIN LIFTING ATTACHMENT FOR MOWING MACHINES.
APPLICATION FILED SEPT. 26, 1904.
NO MODEL.
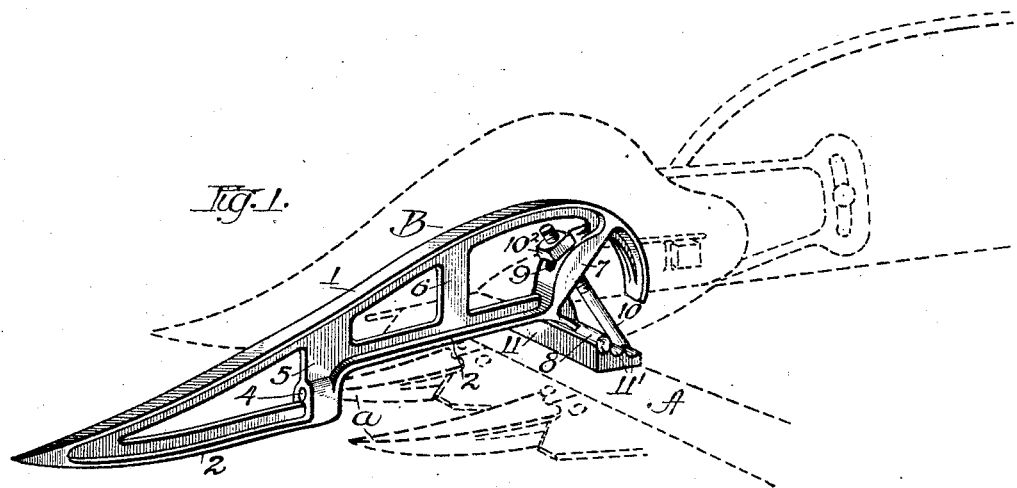
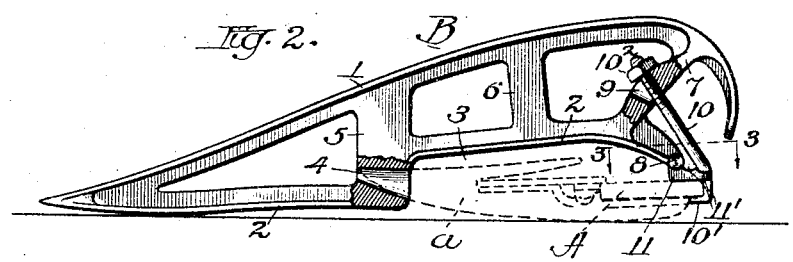
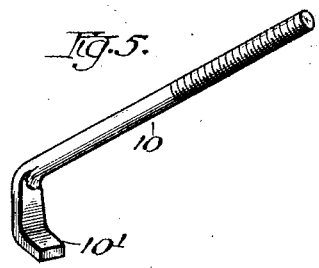
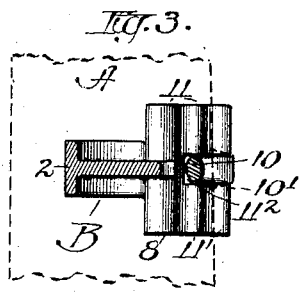
Witnesses:
Inventors
Maurice Kane
Franklin P. Burkhardt
By J. C. Warner
Attorney No. 777,733.

Patented December 20, 1904.

UNITED STATES PATENT OFFICE.

MAURICE KANE, OF CHICAGO, ILLINOIS, AND FRANKLIN P. BURKHARDT, OF SPRINGFIELD, OHIO, ASSIGNORS TO INTERNATIONAL HARVESTER COMPANY, A CORPORATION OF NEW JERSEY.

GRAIN-LIFTING ATTACHMENT FOR MOWING-MACHINES.

SPECIFICATION forming part of Letters Patent No. 777,733, dated December 20, 1904.

Application filed September 26, 1904. Serial No. 225,904.

*To all whom it may concern:*

Be it known that we, MAURICE KANE, residing at Chicago, in the county of Cook and State of Illinois, and FRANKLIN P. BURKHARDT, residing at Springfield, in the county of Clark and State of Ohio, citizens of the United States, have invented a new and useful Improvement in Grain-Lifting Attachments for Mowing-Machines, of which the following is a complete specification.

This invention relates to grain-lifting devices for mowing-machines, and more specifically to that class of attachments known as "pea-vine lifters," the object being to provide simple and efficient means for such purpose and which shall be vertically adjustable with respect to and readily detachable from the finger-bar of the mower.

With these and other objects in view the invention consists of the several details of construction of parts, as will be hereinafter described, and pointed out in the appended claims.

Referring to the drawings, Figure 1 represents a perspective view of the improved attachment in connection with the finger-bar of a mower, the finger-bar and outer shoe being shown in dotted lines; and Fig. 2 is a side elevation, partly in section, of same. Fig. 3 is a partial section of the device, taken as indicated by the line 3 3 in Fig. 2. Fig. 4 is a perspective setting forth the form and construction of the adjustment-block on which the rear end of the lifting-finger is supported, and Fig. 5 represents a perspective of the clamp-bolt by means of which the lifting-finger is secured to the finger-bar.

Like reference characters refer to like parts throughout the several views.

A is the finger-bar, and $a$ the guards secured thereto, both of which are shown in dotted lines in Figs. 1 and 2.

B designates the lifting-finger, which is comprised of the lower horizontally-extending flange 2 and the upwardly and rearwardly extending flange 1, having its rear end secured and terminating a short distance above and back of the rear edge of the finger-bar. This lower flange 2 is provided with the offset 3, in the forward end of which is formed a tapered opening 4, adapted to receive the point of the guard, the guard and finger-bar being received within the space of said offset. Webs 5, 6, and 7 connect the upper and lower flanges 1 and 2. The flange 2 at its rear end projects downwardly and rearwardly and terminates in the transversely-extending lug 8. The said lug 8 is preferably cylindrical in form and symmetrically disposed with respect to the longitudinal axis of the lifting-finger. In the rear web 7 is formed the conical aperture 9, adapted to receive the clamp-bolt 10. The lower end of this bolt is formed into a bent head 10', which when in position engages the under side of the finger-bar and when the nut $10^2$ is tightened securely clamps the lifting-finger to the said finger-bar.

In order to render the point of the lifting-finger adjustable, the lug 8 instead of contacting the finger-bar A is made to rest upon the adjustment-block 11. This block is made wedge-shaped and is provided with a series of grooves 11', so that as the lug 8 is made to rest in one of the several grooves the point of the lifting-finger will be raised or lowered accordingly, the pivotal point in such movement being about the point of the guard $a$. A slot $11^2$ is cut into the rear edge of the adjustment-block 11 to receive the clamp-bolt 10, and thus enables said lug 8 to be brought near the bolt and better resist the stress of same.

To secure the lifting-finger in place, the point of the guard is inserted in the tapered opening 4, the lug 8 being made to rest in one of the grooves 11' of the adjustment-block, and the clamp-bolt 10 then tightened. To adjust the point of the lifting-finger to the desired elevation, the clamp-bolt is loosened and the grooved adjustment-block moved forward or rearward, accordingly as it is desired to raise or lower said point.

What we claim as our invention, and desire to secure by Letters Patent, is—

1. An attachment for the cutting apparatus of mowing-machines, comprising a lifting-finger arranged to pivotally engage the point of a guard of the cutting apparatus, and means for adjustably securing the rear end of said lifting-finger to the rear edge of said finger-bar, substantially as set forth.

2. An attachment for the cutting apparatus of mowing-machines, comprising a lifting-finger arranged to pivotally engage the point of a guard of the cutting apparatus, a block arranged to support the rear end of said finger and which will, by its backward or forward movement, effect the vertical adjustment thereof, and a clamp-bolt arranged to engage the rear under edge of the finger-bar and secure the said lifting-finger thereto, substantially as set forth.

3. An attachment for the cutting apparatus of mowing-machines, comprising a lifting-finger arranged to pivotally engage the point of a guard of the cutting apparatus, a projecting lug on the rear end thereof, a wedge-shaped block having grooves on the upper surface thereof for receiving said lug, and a clamp-bolt arranged to engage the rear under edge of the finger-bar and secure the said lifting-finger thereto, substantially as set forth.

MAURICE KANE.
FRANKLIN P. BURKHARDT.

Witnesses with respect to the execution of the signature of Maurice Kane:
J. C. WARNES,
MARGARET A. SWEENEY.

Witnesses with respect to the execution of the signature of Franklin P. Burkhardt:
H. B. SPERRY,
J. W. CLARK.